United States Patent
Ooshima et al.

(10) Patent No.: US 8,389,181 B2
(45) Date of Patent: Mar. 5, 2013

(54) FUEL CELL STACK DEVICE, FUEL CELL STACK CONNECTION DEVICE, AND FUEL CELL DEVICE

(75) Inventors: Yoshihide Ooshima, Kirishima (JP); Norimitsu Fukami, Kirishima (JP)

(73) Assignee: Kyocera Corporation, Kyoto (JP)

(*) Notice: Subject to any disclaimer, the term of this patent is extended or adjusted under 35 U.S.C. 154(b) by 302 days.

(21) Appl. No.: 12/678,265

(22) PCT Filed: Sep. 25, 2008

(86) PCT No.: PCT/JP2008/067341
§ 371 (c)(1),
(2), (4) Date: Mar. 15, 2010

(87) PCT Pub. No.: WO2009/041532
PCT Pub. Date: Apr. 2, 2009

(65) Prior Publication Data
US 2010/0203414 A1    Aug. 12, 2010

(30) Foreign Application Priority Data

Sep. 27, 2007  (JP) ................................. 2007-251569
Sep. 27, 2007  (JP) ................................. 2007-251580
Mar. 18, 2008  (JP) ................................. 2008-069011

(51) Int. Cl.
  *H01M 8/24*     (2006.01)
  *H01M 8/12*     (2006.01)
(52) U.S. Cl. .................... 429/517; 429/458; 429/513
(58) Field of Classification Search ............. 429/517
  See application file for complete search history.

(56) References Cited

U.S. PATENT DOCUMENTS 8,026,011 B2 *  9/2011  Ooshima et al. .............. 429/433
2004/0062958 A1 *  4/2004  Facchi et al. .................... 429/13

FOREIGN PATENT DOCUMENTS

| EP | 1 909 349 A1 | 4/2008 |
|---|---|---|
| JP | 10-247507 | 9/1998 |
| JP | 2003-308857 | 10/2003 |
| JP | 2004-288542 | 10/2004 |
| JP | 2006-085981 | 3/2006 |
| JP | 2006-331977 | 12/2006 |
| JP | 2007-059377 | 3/2007 |
| JP | 2007-250281 | 9/2007 |
| JP | 2007-317612 | 12/2007 |

* cited by examiner

Primary Examiner — John S Maples
(74) Attorney, Agent, or Firm — DLA Piper LLP (US)

(57) ABSTRACT

A fuel cell stack device that can suppress a damage to fuel cells is provided. A fuel cell stack device includes a fuel cell stack in which a plurality of columnar fuel cells are arranged upright, and are electrically connected via a current-collecting member interposed between adjacent fuel cells, fuel cells stack-supporting members disposed so as to hold the fuel cell stack via an end current-controlling member from both end sides, and a manifold that fixes lower ends of the fuel cells, and that supplies a reactant gas to the fuel cells. The fuel cell stack-supporting member has a lower end fixed to the manifold and is an elastically deformable member, and is disposed such that a fixed portion thereof fixed to the manifold is at a same or lower level than a fixed portion of the fuel cells.

17 Claims, 12 Drawing Sheets

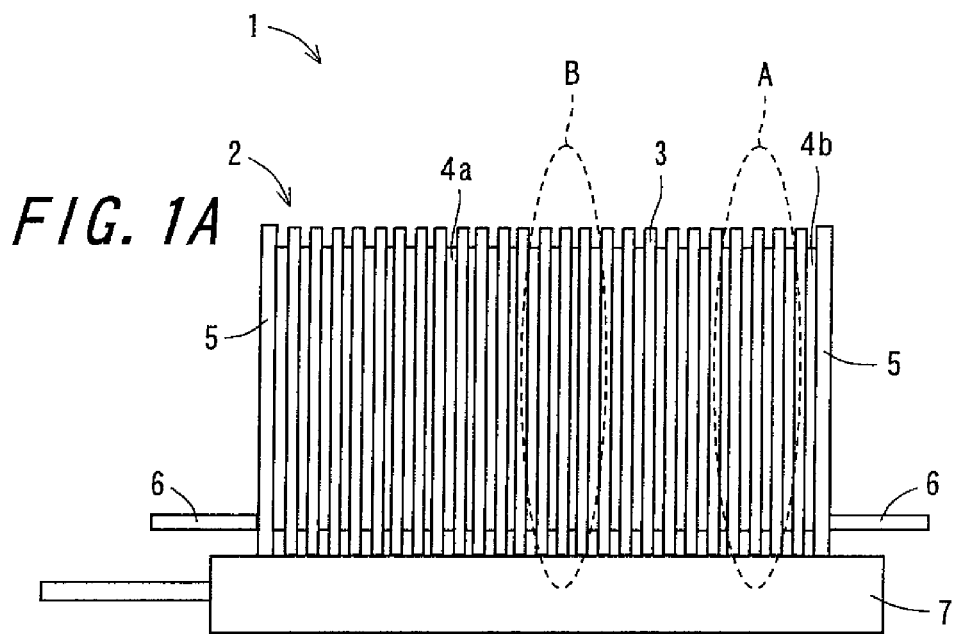
FIG. 1A
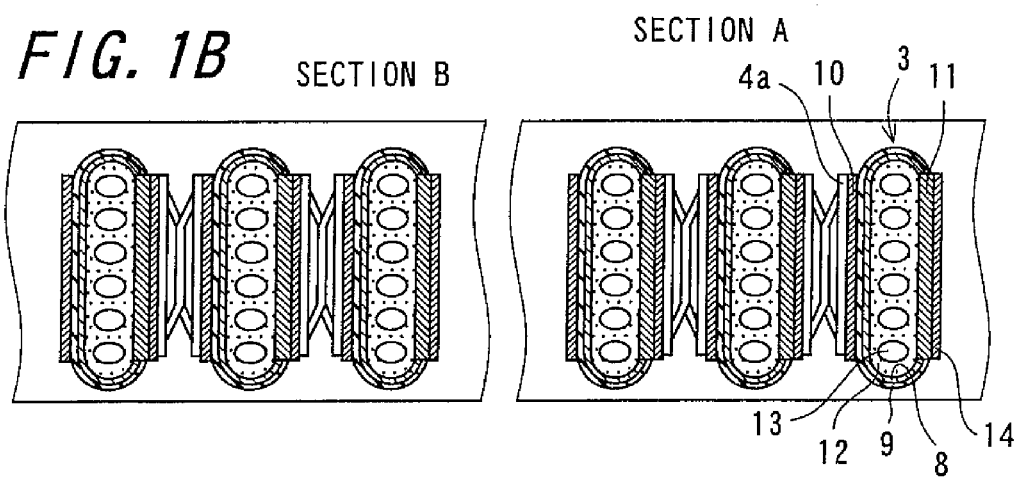
FIG. 1B  SECTION B    SECTION A

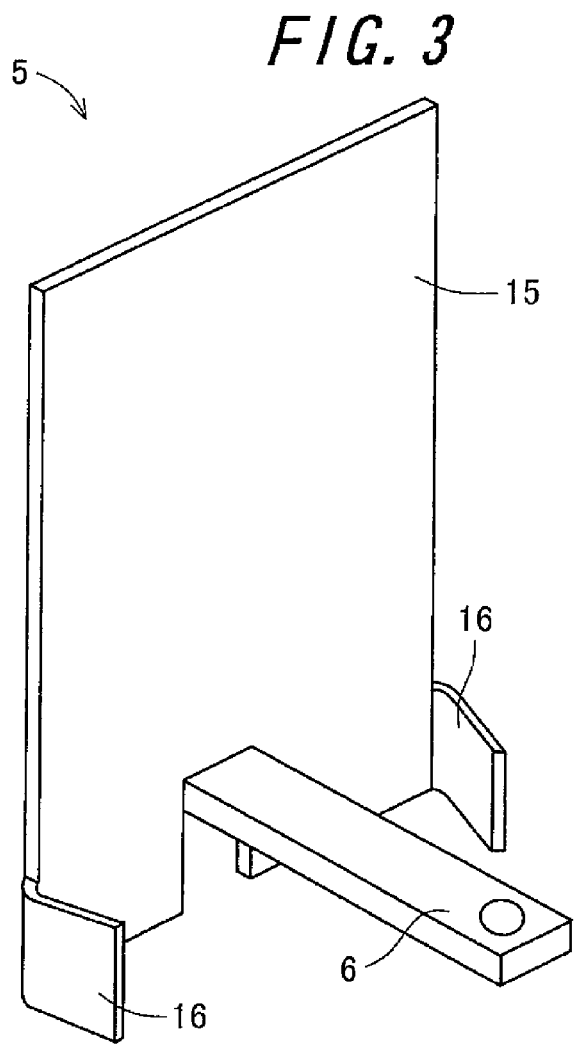
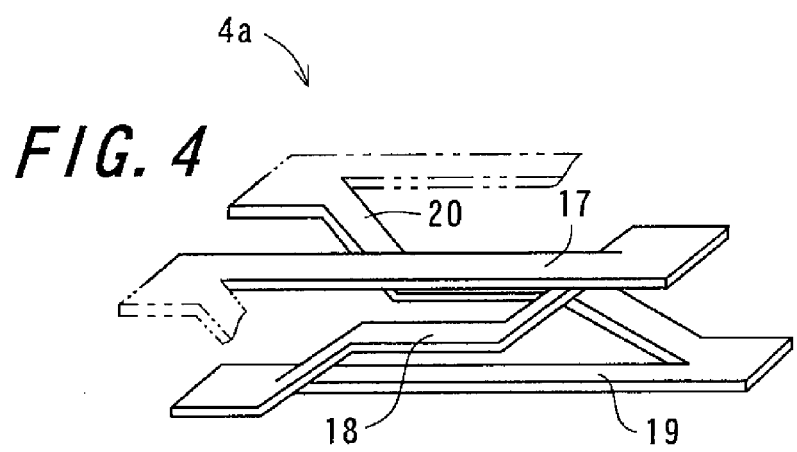

FUEL CELL STACK DEVICE, FUEL CELL STACK CONNECTION DEVICE, AND FUEL CELL DEVICE

CROSS-REFERENCE TO THE RELATED APPLICATIONS

This application is a national stage of international application No. PCT/JP2008/067341, filed on Sep. 25, 2008, and claims the benefit of priority under 35 USC 119 to Japanese Patent Application No. 2007-251580, filed Sep. 27, 2007, Japanese Patent Application No. 2007-251569, filed Sep. 27, 2008 and Japanese Patent Application No. 2008-069011 filed Mar. 18, 2008, the entire contents of all of which are incorporated herein by reference.

TECHNICAL FIELD

The present invention relates to a fuel cell stack device that includes a fuel cell stack in which a plurality of columnar fuel cells are linearly arranged upright in one line and are electrically connected, a fuel cell stack connection device in which such fuel cell stack devices are connected, and a fuel cell device.

BACKGROUND ART

Recently, as a next generation energy, a fuel cell device is proposed in which a fuel cell stack (device) is accommodated in a container, the fuel cell stack having a row of a plurality of fuel cells that can obtain electrical power using a fuel gas (hydrogen-containing gas) and an oxygen-containing gas (typically, air) (see Japanese Unexamined Patent Publication JP-A 2003-308857, for example).

In this sort of fuel cell device, a plurality of fuel cells are arranged upright and are electrically connected via a current-collecting member interposed between adjacent fuel cells, fuel cell stack-supporting members are arranged via end current-collecting members on both sides in the arrangement direction, a fuel cell stack device in which the fuel cells in this state are fixed to a manifold for supplying a fuel gas and the like to the fuel cells is accommodated in an container, and the fuel cell stack device is surrounded by a heat insulator such that radiant heat generated by the fuel cell stack device producing electric power is not transmitted to the outside.

FIG. 12A is a side view showing a conventional fuel cell stack device 51, and FIG. 12B is a plan view extracting part of FIG. 12A. In this sort of fuel cell stack device 51, a plurality of columnar fuel cells 53 are arranged upright via a current-collecting member 54a interposed therebetween, conductive members 55 are arranged via end current-collecting members 54b on both sides in the arrangement direction, and, in this state, the lower ends of the fuel cells 53 and the conductive members 55 are fixed to a manifold 57 for supplying a reactant gas (a fuel gas and the like).

FIG. 13 is a perspective view extracting the conductive member 55 forming the conventional fuel cell stack device 51 shown in FIG. 12A, and the conductive member includes a flat plate portion 65 and a pair of side plate portions 66 that are bent from both edges of the flat plate portion 65.

When the fuel cell device that accommodates the fuel cell stack device is operated, the temperature of the fuel cells increases. Here, in the case where the coefficient of thermal expansion varies between constituent elements forming the fuel cells, the fuel cells may be warped. When this sort of warping occurs, stress is generated in the fuel cells. Here, in a fuel cell stack in which a plurality of columnar fuel cells are arranged upright, intensive stress may be generated particularly in fuel cells on end sides in the warping direction of the fuel cells, and these fuel cells may be damaged.

Here, the conductive member 55 as shown in FIG. 13 has high rigidity, and a firm structure is obtained. Thus, in the case where the conductive member 55 is used, fuel cells on end sides in the arrangement direction of the fuel cells may be damaged.

Accordingly, it is conceivable that elastically deformable members that can be deformed flexibly following the deformation (warping) of the fuel cells are arranged on both end sides of the fuel cell stack, thereby relaxing stress generated in the fuel cells, and suppressing a damage to the fuel cells.

Furthermore, when a fuel cell device that accommodates such a fuel cell stack device is assembled, a heat insulator is disposed around the fuel cell stack device in order to suppress transmission, to the outside, of radiant heat generated by the fuel cells producing electric power.

However, in the case where the heat insulator is disposed close to the fuel cell stack device having an elastically deformable conductive member, the conductive member deformed following the deformation (warping) of the fuel cells may be brought into contact with the heat insulator, stress generated in the fuel cells may not be relaxed, and a damage to the fuel cells may not be suppressed.

Furthermore, it is also conceivable that the heat insulator is disposed with a predetermined spacing interposed from the elastically deformable conductive member assuming the length by which the conductive member is deformed, but, in this case, positional adjustment of the heat insulator is difficult. Furthermore, there is a problem in that an assembly process of a fuel cell device that accommodates a fuel cell stack device becomes complex.

DISCLOSURE OF INVENTION

It is an object of the invention to provide a fuel cell stack device that can suppress a damage to the fuel cells and that can solve complexity in an assembly process of a fuel cell device, and to provide a fuel cell device that accommodates a fuel cell stack device.

A fuel cell stack device of the invention includes a fuel cell stack in which a plurality of columnar fuel cells are arranged upright, and are electrically connected via a current-collecting member interposed between adjacent fuel cells; a manifold that fixes lower ends of the fuel cells, and that supplies a reactant gas to the fuel cells; and an elastically deformable fuel cell stack-supporting member that has a lower end fixed to the manifold, and that is disposed so as to hold the fuel cell stack via an end current-collecting member from both end sides in an arrangement direction of the fuel cells of the fuel cell stack. The fuel cell stack-supporting member is disposed such that a fixed portion thereof fixed to the manifold is at a same or lower level than a fixed portion of the fuel cells.

A fuel cell stack connection device of the invention is constituted so that two fuel cell stack devices described above are arranged side by side such that arrangement directions of the fuel cells are parallel to each other and such that polarities of currents at ends of the fuel cell stack devices on a same side are opposite each other, and the current-drawing portions arranged at ends of the fuel cell stack devices on a same side are connected by a conductive connecting member.

A fuel cell device of the invention is constituted by accommodating the fuel cell stack device described above or the fuel cell stack connection device described above in a container.

BRIEF DESCRIPTION OF DRAWINGS

Objects, features, and advantages of the invention will be more explicit from the following detailed description taken with reference to the drawing, wherein:

FIG. 1A is a side view schematically showing a fuel cell stack device according to a first embodiment of the invention;

FIG. 1B is a plan view partially enlarging portions enclosed by dotted frames in the fuel cell stack device in FIG. 1A;

FIG. 3 is a perspective view showing another example of a fuel cell stack-supporting member forming the fuel cell stack device according to the first embodiment of the invention;

FIG. 4 is a perspective view showing an example of a current-collecting member forming the fuel cell stack device of the invention;

BEST MODE FOR CARRYING OUT THE INVENTION

Figure 2:
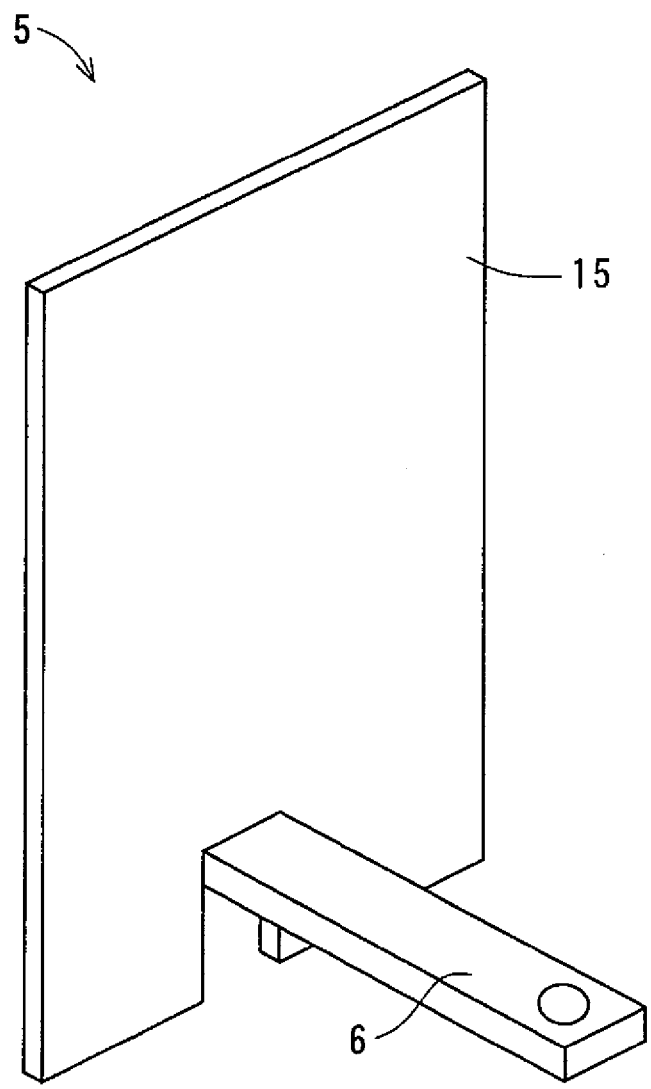
FIG. 2 is a perspective view showing an example of a fuel cell stack-supporting member forming the fuel cell stack device according to the first embodiment of the invention.

Now referring to the drawings, preferred embodiments of the invention are described below.
(First Embodiment)

FIGS. 1A and 1B show an example of a fuel cell stack device 1 according to a first embodiment of the invention, where FIG. 1A is a side view schematically showing the fuel cell stack device 1, and FIG. 1B is a plan view partially enlarging the fuel cell stack device 1 in FIG. 1A, extracting portions enclosed by dotted frames shown in FIG. 1A. Here, the same constituent elements are denoted by the same reference numerals, and the same can be applied to the following description. Here, in FIG. 1B, in order to clearly indicate portions corresponding to the portions A and B enclosed by dotted frames shown in FIG. 1A, the captions "SECTION A" and "SECTION B" are added to FIG. 1B.

Here, the fuel cell stack device 1 is configured by forming a fuel cell stack 2 so that a plurality of fuel cells 3 in the shape of columns (e.g., in the shape of hollow flat plates) are arranged upright and are electrically connected in series via a current-collecting member 4a interposed between adjacent fuel cells 3, each fuel cell being formed by sequentially layering a fuel-side electrode layer 8, a solid electrolyte layer 9, and an air-side electrode layer 10 on one flat face of a columnar conductive support substrate 12 (hereinafter, this constituent element may be abbreviated as a "support substrate 12") having a pair of opposing flat faces; and fixing the lower ends of the fuel cells 3 to a manifold 7 for supplying a reactant gas (a fuel gas and the like) to the fuel cells 3. Here, the following description will be given using an example in which a fuel gas is supplied from the manifold 7 to the fuel cells 3. The fuel cell stack device 1 includes elastically deformable fuel cell stack-supporting members 5 that have lower ends fixed to the manifold 7 and that hold the fuel cell stack 2 via end current-collecting members 4b from both end sides in the arrangement direction of the fuel cells 3. Here, FIG. 1A shows the case in which fixed portions of the fuel cell stack-supporting members 5 fixed to the manifold 7 are arranged at the same level as fixed portions of the fuel cells 3 at the lower ends fixed to the manifold 7. That is to say, the fuel cell stack-supporting members 5 and the fuel cells 3 are arranged upright on a flat flush surface of the manifold 7. Furthermore, the fuel cell stack-supporting members 5 shown in FIG. 1A have current-drawing portions 6 that extend outward along the arrangement direction of the fuel cells, and that draw a current generated by the fuel cells 3 producing electric power.

Furthermore, an interconnector 11 is disposed on the other flat face of the fuel cell 3, and gas flow paths 13 for causing a fuel gas to flow through the fuel cell 3 are arranged inside the support substrate 12.

Furthermore, a P-type semiconductor layer 14 is disposed on an outer face (upper face) of the interconnector 11. When the current-collecting member 4a is connected via the P-type semiconductor layer 14 to the interconnector 11, the contact therebetween is ohmic contact, a drop in potential is reduced, and a reduction in current-collecting performance can be effectively avoided.

Furthermore, the support substrate 12 also functions as the fuel-side electrode layer 8, and the fuel cell 3 can be formed by sequentially layering the solid electrolyte layer 9 and the air-side electrode layer 10 on the surface of the support substrate 12.

Here, in the invention, various fuel cells are known as the fuel cells 3, but solid oxide fuel cells can be used to obtain fuel cells having a good efficiency in producing electric power. Accordingly, the size of a fuel cell device for unit electrical power can be reduced, and the load following operation can be performed that follows a varying load, which is required for fuel cells for household use.

Hereinafter, constituent elements forming the fuel cell stack device 1 (the fuel cells 3, etc.) shown in FIGS. 1A and 1B will be described.

The fuel-side electrode layer 8 may be an ordinarily known fuel-side electrode layer, and may be made of a porous conductive ceramic, such as $ZrO_2$ solid solution containing a rare earth element (referred to as stabilized zirconia) and Ni and/or NiO.

The solid electrolyte layer 9 functions as an electrolyte that transfers electrons between the electrode layers 8 and 10, is required to shield gas in order to prevent a fuel gas and an oxygen-containing gas from leaking, and is made of $ZrO_2$ solid solution containing 3 to 15 mol % of rare earth element. Here, the solid electrolyte layer 9 may be made of other materials as long as the above-described properties are obtained.

There is no particular limitation on the air-side electrode layer 10 as long as an ordinarily used air-side electrode layer is used, and, for example, the air-side electrode layer 10 may be made of a conductive ceramic including a so-called $ABO_3$ perovskite-type oxide. The air-side electrode layer 10 is required to be permeable to gas, and preferably has a porosity of 20% or more, in particular, 30 to 50%.

The interconnector 11 may be made of a conductive ceramic, but is required to be reduction-resistant and oxidation-resistant, because the interconnector is brought into contact with a fuel gas (hydrogen-containing gas) and an oxygen-containing gas (air, etc.), and, thus, is preferably made of a lanthanum chromite-based perovskite-type oxide ($LaCrO_3$-based oxide). The interconnector 11 has to be dense in order to prevent leakage of a fuel gas passing through the gas flow paths 13 formed through the support substrate 12 and an oxygen-containing gas passing through paths outside the support substrate 12, and preferably has a relative density of 93% or more, in particular, 95% or more.

The support substrate 12 is required to be permeable to gas in order to transmit a fuel gas to the fuel-side electrode layer 8, and to be conductive in order to collect a current via the interconnector 11. Accordingly, the support substrate 12 is required to be made of a material that satisfies these demands, and, for example, may be made of a conductive ceramic, a cermet, or the like.

Furthermore, in the fuel cell 3 shown in FIGS. 1A and 1B, the support substrate 12 in the shape of a column (in the shape of a hollow flat plate) is a plate-like piece that extends so as to be long in the upright direction, and has two flat faces and two semicircular side faces. The lower ends of the fuel cells 3 and the lower ends of the fuel cell stack-supporting members 5 (described later) are joined to the manifold 7 that supplies a reactant gas (fuel gas) to the fuel cells 3, for example, via a glass sealing member having an excellent thermal resistance, and the gas flow paths 13 arranged through the support substrates 12 are connected to a fuel gas chamber (not shown). Here, the following description will be given using fuel cells 3 in the shape of hollow flat plates.

Here, in the case where the support substrate 12 is produced by being fired simultaneously with the fuel-side electrode layer 8 or the solid electrolyte layer 9 in the production of the fuel cells 3, the support substrate 12 is preferably made of an iron-group metal component and a specific rare earth oxide. Furthermore, in order to be permeable to gas, the support substrate 12 preferably has a porosity of 30% or more, in particular, 35 to 50%, and preferably has a conductivity of 300 S/cm or more, in particular, 440 S/cm or more.

Furthermore, examples of the P-type semiconductor layer 14 include a layer made of a transition metal perovskite-type oxide, more specifically, a material having an electron conductivity larger than that of a lanthanum chromite-based perovskite-type oxide ($LaCrO_3$-based oxide) forming the interconnector 11, such as a P-type semiconductor ceramic including at least one of an $LaMnO_3$-based oxide, an $LaFeO_3$-based oxide, an $LaCoO_3$-based oxide and the like in which Mn, Fe, Co and the like are present in the B site. Typically, the thickness of the P-type semiconductor layer 14 is preferably 30 to 100 μm.

Furthermore, the current-collecting member 4a and the end current-collecting members 4b interposed for electrically connecting the fuel cells 3 may be made of a member including elastic metal or alloy, or a member obtained by performing necessary surface treatment on felt including metal fiber or alloy fiber. Here, the shape of the current-collecting member 4a and the end current-collecting members 4b will be described later.

Furthermore, the fuel cell stack-supporting members 5 are arranged upright with the lower ends thereof fixed to the manifold 7 such that the fuel cell stack-supporting members 5 hold the fuel cell stack 2 from both end sides in the arrangement direction of the fuel cells 3, and the fixed portions of the fuel cell stack-supporting members 5 fixed to the manifold 7 are arranged at the same or lower level than those of the fuel cells 3 at the lower ends fixed to the manifold 7. That is to say, the fuel cell stack-supporting members 5 and the fuel cells 3 are arranged upright on a flat flush surface of the manifold 7.

In the fuel cell stack device 1 produced from the fuel cells 3 as described above, the temperature of the fuel cells 3 increases according to the operation of the fuel cell stack device 1. In this case, the fuel cells 3 may be deformed (e.g., warped) due to a difference in coefficient of thermal expansion between the air-side electrode layer 10 and the interconnector 11 that are arranged on the flat faces of the support substrate 12. Furthermore, in the case where the fuel cells 3 are produced by being fired in the air using NiO that can be contained in the support substrate 12 or the fuel-side electrode layer 8, reduction treatment has to be performed in advance. At that time, due to a difference in the reduced state between the air-side electrode layer 10 and the interconnector 11, the deformed amount may differ therebetween, and the fuel cells 3 may be deformed (e.g., warped). In particular, the fuel cells 3 produced from the composition as described above may be deformed (warped) so as to be bent to the side of the air-side electrode layer 10.

Here, in the case where the fuel cells 3 are deformed (warped), when the rigidity of the fuel cell stack-supporting members 5 that are arranged so as to hold the fuel cells 3 from both end sides in the arrangement direction is high, the fuel cell stack-supporting members 5 cannot be deformed flexibly following the deformation of the fuel cells 3, and intensive stress may be generated particularly in the fuel cells 3 on the lower end side (on the side of the manifold 7). In this case, the fuel cells 3 on the lower end side (on the side of the manifold 7) may be damaged (e.g., cracked).

Accordingly, the fuel cell stack-supporting members 5 can be preferably deformed flexibly following the deformation of the fuel cells 3, and, in the invention, the fuel cell stack-supporting members 5 axe elastically deformable members.

Here, the fuel cell stack-supporting members 5 may be made of any member as long as the member can be elastically deformed, and, for example, plate-like members, rod-like members, mesh-like members, and the like may be appropriately selected and used.

Furthermore, the shape of the fuel cells 3 may be any shape as long as the shape is columnar, and, for example, the fuel cells 3 may be in the shape of hollow flat plates or cylinders.

FIG. 2 shows an example of the fuel cell stack-supporting member 5 forming the fuel cell stack device 1 of the invention. Here, the fuel cell stack-supporting member 5 shown in FIG. 2 includes an elastically deformable flat plate portion 15 and a current-drawing portion 6 that is disposed on the flat plate portion 15 and that extends outward along the arrangement direction of the fuel cells 3.

Here, the fuel cell stack-supporting members 5 have the flat plate portions 15, and, thus, the fuel cell stack-supporting members 5 can efficiently collect a current generated by the fuel cells 3 producing electric power via the columnar fuel cells 3 (the following description will be given using fuel cells 3 in the shape of hollow flat plates) and the end current-collecting members 4b.

Furthermore, the lower ends of the elastically deformable flat plate portions 15 are fixed to the manifold 7 for supplying a fuel gas (reactant gas) to the fuel cells 3, and, thus, a portion (region) of the flat plate portions 15 not fixed to the manifold 7 can be deformed flexibly following the deformation of the fuel cells 3. Accordingly, stress generated in the fuel cells 3, in particular, stress generated in the fuel cells 3 on the upper end side can be relaxed.

Furthermore, the fixed portions of the fuel cell stack-supporting members 5 fixed to the manifold 7 are arranged at the same or lower level than those of the fuel cells 3 at the lower ends fixed to the manifold 7, and, thus, stress generated in the fuel cells 3, in particular, stress generated in the fuel cells 3 on the lower end side can be relaxed.

Accordingly, stress generated in the fuel cells 3 can be relaxed, and, thus, a damage to the fuel cells 3 can be suppressed.

Here, the phrase "the fixed portions of the fuel cell stack-supporting members 5 fixed to the manifold 7 are arranged at the same or lower level than those of the fuel cells 3 at the lower ends fixed to the manifold 7" refers to a state in which the fuel cell stack-supporting members 5 and the fuel cells 3 are arranged upright on a flat flush surface of the manifold 7. More specifically, in the case where the fuel cell stack-supporting members 5 and the fuel cells 3 are fixed to the manifold 7 via a joint member such as a glass sealing member, this phrase refers to a state in which the interface between the fuel cell stack-supporting members 5 and the joint member is disposed at the same or lower level than the interface between the fuel cells 3 and the joint member.

Here, in the case where the fuel cell stack-supporting members 5 are elastically deformable members, it is preferable that the fuel cell stack-supporting members 5 are made of an elastically deformable material and that the thickness of the flat plate portions 15 is reduced. Accordingly, the flat plate portions 15 can be elastically deformed (or can be more elastically deformed), and, thus, can be deformed flexibly following the deformation of the fuel cells 3. Thus, the thickness of the flat plate portions 15 is, for example, approximately 2 mm, preferably, approximately 1 mm.

Furthermore, the length of the fuel cell stack-supporting members 5 is preferably set such that the upper end portions of the fuel cell stack-supporting members 5 that are fixed to the manifold 7 is at the same or upper level than the upper end portions of the fuel cells 3, in order to effectively relax stress generated in the fuel cells 3 and to efficiently collect a current generated by the fuel cells 3 producing electric power. Furthermore, the width of the fuel cell stack-supporting members 5 is preferably the same as or larger than that of the fuel cells 3.

Furthermore, the fuel cell stack-supporting members 5 have to be conductive in order to collect a current generated by the fuel cells 3 producing electric power, and may be made of, for example, stainless steel or the like. Here, if necessary, a thermal-resistant coating may be formed thereon.

Furthermore, in the case where the current-drawing portions 6 are arranged on the fuel cell stack-supporting members 5, the current-drawing portions 6 are preferably arranged on the lower end side of the flat plate portions 15. Furthermore, in the case where the fuel cell stack-supporting members 5 including the current-drawing portions 6 are fixed to the manifold 7, the fuel cell stack-supporting members 5 are preferably fixed to the manifold 7 at a position lower than the current-drawing portions 6 such that the current-drawing portions 6 on the flat plate portions 15 are not brought into contact with the manifold. Here, the height of the current-drawing portions 6 can be set as appropriate according to the shape of the manifold 7, the size of the flat plate portions 15, and the like. Accordingly, regions of the flat plate portions 15 fixed to the manifold 7 also can be set as appropriate.

FIG. 3 shows another example of the fuel cell stack-supporting member 5 forming the fuel cell stack device 1 of the invention. Here, the flat plate portion 15 is connected to the current-drawing portion 6, and includes a pair of side plate portions 16 that are arranged at a position lower than the current-drawing portion 6 and that extend so as to be bent from both edges of the flat plate portion 15.

Here, examples of the shape of the manifold 7 include a shape that has opening portions on a surface (on the side of the fuel cells 3), a shape in which the manifold 7 has a top plate portion having insertion holes or the like corresponding to the fuel cells 3 and the fuel cell stack-supporting members 5, and the like.

Here, in the case where the manifold 7 has a shape that has opening portions on the surface thereof, since the fuel cell stack-supporting members 5 have the pair of side plate portions 16 that extend so as to be bent from both edges of the flat plate portion 15, the joint area between the fuel cell stack-supporting members 5 and the manifold 7 (joint member) can be increased, and the fuel cell stack-supporting members 5 can be stably fixed to the manifold 7.

Furthermore, in the case where the manifold 7 has a top plate portion, the top plate portion is provided with insertion holes corresponding to the shape of the fuel cell stack-supporting members 5 (and provided with insertion holes corresponding to the shape of the fuel cells 3), and, thus, the positional adjustment of the fuel cell stack 2 and the fuel cell stack-supporting members 5 can be easily performed.

Here, the side plate portions 16 are arranged at a position lower than the current-drawing portions 6 arranged on the lower end side of the flat plate portions 15, and, thus, the rigidity of the entire flat plate portions 15 can be reduced, and, in particular, portions (regions) of the flat plate portions 15 not having the side plate portions 16 can be elastically deformed (or can be more elastically deformed) and, thus, can be deformed flexibly following the deformation of the fuel cells 3.

Furthermore, in the case where the fuel cell stack-supporting members 5 having the side plate portions 16 are fixed to the manifold 7, portions of the flat plate portions 15 forming the fuel cell stack-supporting members 5 lower than the current-drawing portions 6 and the side plate portions 16 are preferably fixed to the manifold 7 via the joint member.

Accordingly, since the portions of the flat plate portions 15 lower than the current-drawing portions 6 and the side plate portions 16 are fixed to the manifold 7 via the joint member, the joint area between the fuel cell stack-supporting members 5 and the manifold 7 (joint member) can be increased, and the fuel cell stack-supporting members 5 can be firmly fixed to the manifold 7.

In addition, since the portions of the flat plate portions 15 forming the fuel cell stack-supporting members 5 lower than the current-drawing portions 6 and the side plate portions 16 are fixed to the manifold 7, portions (regions) of the flat plate portions 15 forming the fuel cell stack-supporting members 5 not fixed to the manifold 7 can be increased, and the flat plate portions 15 can be elastically deformed, and, thus, can be deformed flexibly following the deformation of the fuel cells 3.

Here, in the case where the fuel cells 3 and the fuel cell stack-supporting members 5 are fixed to the manifold 7 via the joint member, examples of the joint member that can be used include insulating joint members such as a glass sealing member. Accordingly, the insulating properties between the manifold 7 and the current-drawing portions 6 can be secured.

Furthermore, the current-drawing portions 6 are preferably not fixed via a joint member such as a glass sealing member. The reason for this is that, in a state where current wires are connected to the current-drawing portions 6, the current-drawing portions 6 may be moved, for example, by vibrations generated when the fuel cell device that accommodates the fuel cell stack device of the invention is moved or transported, or when the fuel cell device is installed, and, thus, stress may be applied to the fuel cell stack-supporting members 5 (the flat plate portions 15), and, for example, the fuel cells 3 may be damaged or the joint member such as a glass sealing member may be cracked.

FIG. 4 shows an example of the current-collecting member 4a for electrically connecting the fuel cells 3 in the fuel cell stack device 1 of the invention. The current-collecting member 4a shown in FIG. 4 includes, as basic constituent elements, a first conductive piece 17 that is brought into contact with a flat face of one of adjacent fuel cells 3, a second conductive piece 18 that is inclined and extends from an end portion on one side of the one of the adjacent fuel cells 3 to an end portion on the other side of the other of the adjacent fuel cells 3, a third conductive piece 19 that is brought into contact with a flat face of the other of the adjacent fuel cells 3, and a fourth conductive piece 20 that is inclined and extends from an end portion on one side of the other of the adjacent fuel cells 3 to an end portion on the other side of the one of the adjacent fuel cells 3. The end portions of the first to the fourth conductive pieces are sequentially connected in this order, and the conductive pieces are repeatedly connected in this order to form the current-collecting member 4a that extends in one piece in the axial direction.

This sort of current-collecting member 4a has a shape that can well follow the deformation of the fuel cells 3, and, thus, the current-collecting member 4a is useful in the fuel cell stack device 1 of the invention. Furthermore, the end current-collecting members 4b can also have the same shape as that of the current-collecting member 4a.

(Second Embodiment)

Figure 5A:
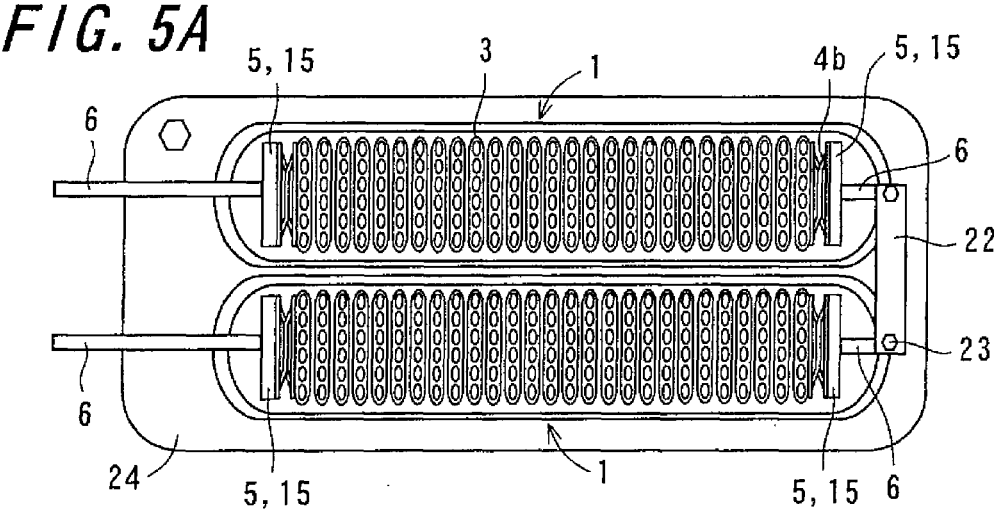
FIG. 5A is a plan view schematically showing a fuel cell stack connection device according to of a second embodiment of the invention.
Figure 5B:
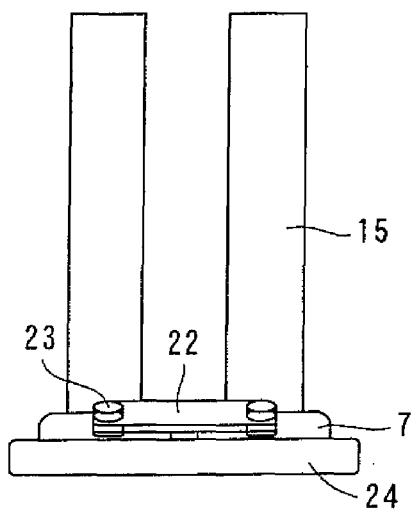
FIG. 5B is a front view of the fuel cell stack connection device in FIG. 5A.

FIGS. 5A and 5B show a fuel cell stack connection device 21 according to a second embodiment of the invention, where FIG. 5A is a plan view, and FIG. 5B is a front view. Here, in FIG. 5A, the current-collecting members 4a for electrically connecting the fuel cells 3 are not shown. In the fuel cell stack connection device 21, two fuel cell stack devices 1 are arranged side by side such that the arrangement directions of the fuel cells 3 are parallel to each other and such that the polarities of currents at ends of the fuel cell stack devices 1 on the same side are opposite each other, and the current-drawing portions 6 arranged at ends of the fuel cell stack devices 1 on the same side are connected by a conductive connecting member 22.

As shown in FIGS. 5A and 5B, the current-drawing portions 6 arranged at ends of two fuel cell stack devices 1 on the same side, which are arranged side by side such that the polarities of currents are opposite each other, are connected by screwing the conductive connecting member 22 with screws 23, and, thus, the two fuel cell stack devices 1 can be electrically connected in series.

Accordingly, the two fuel cell stack devices 1 can be easily electrically connected in series, and can be arranged in a small space.

In this case, the manifolds 7 are connected to a hollow member (pedestal) 24, and, thus, a reactant gas (fuel gas) can be supplied from one reactant gas supply tube to the manifolds 7 of the two fuel cell stack devices 1 forming the fuel cell stack connection device 21. Accordingly, the size of the fuel cell stack connection device 21 can be reduced.

Furthermore, in the case where the fuel cell stack device 1 or the fuel cell stack connection device 21 described above is accommodated in a container, even when the fuel cells 3 are deformed, the fuel cell stack-supporting members 5 (the flat plate portions 15) can be deformed flexibly following the deformation of the fuel cells 3, and, thus, stress generated in the fuel cells 3 can be relaxed, and a damage to the fuel cells 3 can be suppressed. Accordingly, a fuel cell device having an improved reliability for a long period of time can be obtained.

(Third Embodiment)

Figure 6A:
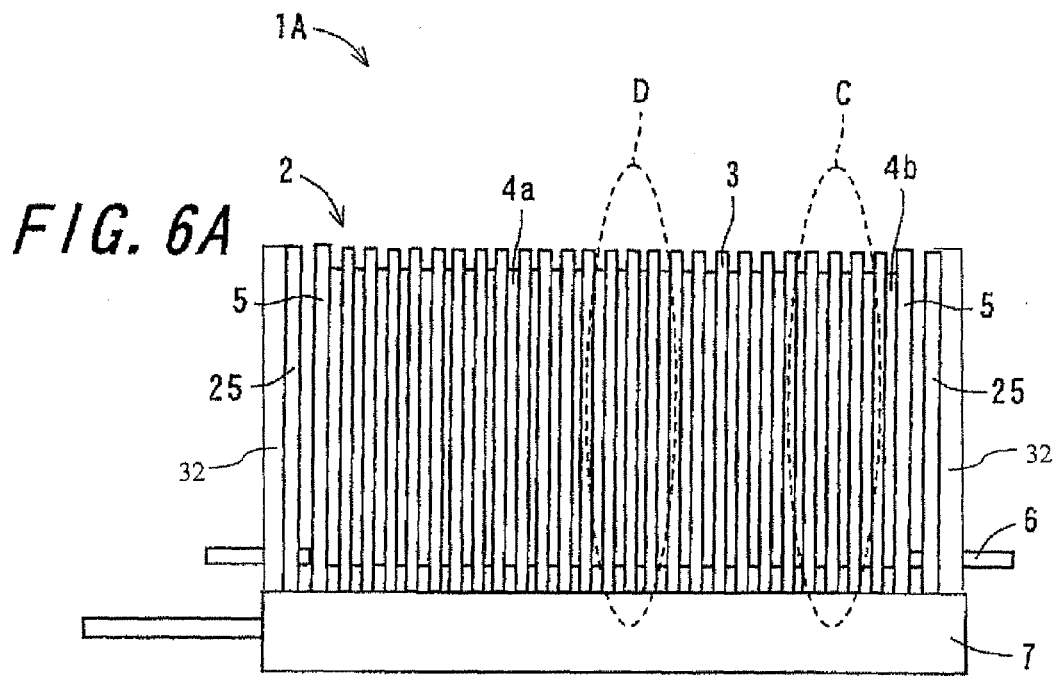
FIG. 6A is a side view schematically showing a fuel cell stack device according to a third embodiment of the invention.
Figure 6B:
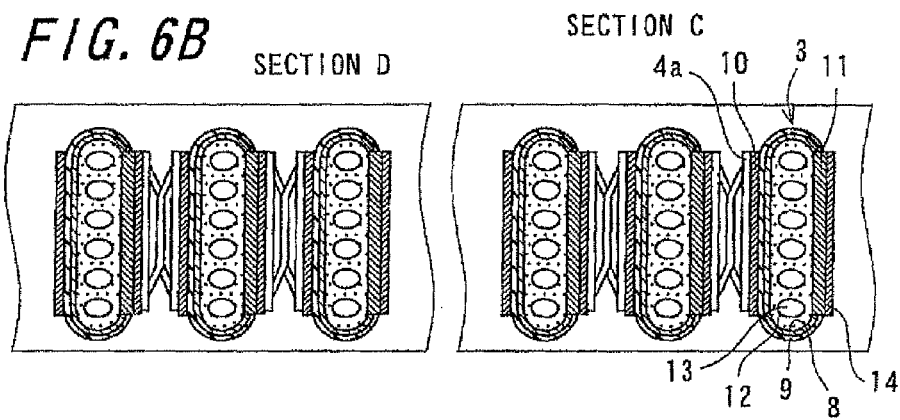
FIG. 6B is a plan view partially enlarging portions enclosed by dotted frames in the fuel cell stack device in FIG. 6A.

FIG. 6A shows an example of a fuel cell stack device 1A according to a third embodiment of the invention. FIG. 6A is a side view schematically showing the fuel cell stack device 1A, and FIG. 6B is a plan view partially enlarging the fuel cell stack device 1A in FIG. 6A, extracting the portions enclosed by dotted frames shown in FIG. 6A. Here, in FIG. 6B, in order to clearly indicate portions corresponding to the portions C and D enclosed by dotted frames shown in FIG. 6A, the captions "SECTION C" and "SECTION D" are added to FIG. 6B.

Here, the fuel cell stack device 1A is similar to the fuel cell stack device 1 of the first embodiment. The fuel cell stack device 1A has a lower end fixed to the manifold 7, and further includes heat-insulator-supporting members 25 that are arranged with a predetermined spacing interposed from the fuel cell stack-supporting members 5. Here, FIG. 6A shows the case in which fixed portions of the fuel cell stack-supporting members 5 fixed to the manifold 7 are arranged at the same level as fixed portions of the fuel cells 3 at the lower ends fixed to the manifold 7.

Furthermore, the fuel cell stack-supporting members 5 shown in FIG. 6A have current-drawing portions 6 that extend outward along the arrangement direction of the fuel cells 3, and that draw a current generated by the fuel cells 3 producing electric power.

Furthermore, in the fuel cells 3 shown in FIGS. 6A and 6B, the support substrate 12 in the shape of a column (in the shape of a hollow flat plate) is a plate-like piece that extends so as to be long in the upright direction, and has two flat faces and two semicircular side faces. The lower ends of the fuel cells 3, the lower ends of the fuel cell stack-supporting members 5, and the lower ends of the heat-insulator-supporting members 25 are fixed to the manifold 7 that supplies a reactant gas (fuel gas) to the fuel cells 3 via a joint member, and the gas flow paths 13 arranged through the support substrates 12 are connected to a fuel gas chamber (not shown).

Here, the fuel cell stack-supporting members 5 are arranged upright and fixed to the manifold 7 so as to hold the fuel cell stack 2 via the end current-collecting members 4b from both end sides in the arrangement direction of the fuel cells 3, and the upper ends of the fixed portions of the fuel cell stack-supporting members 5 fixed to the manifold 7 are arranged at the same level as or lower than the upper ends of the fixed portions of the fuel cells 3 at the lower ends fixed to the manifold 7.

Here, the phrase "the upper ends of the fixed portions of the fuel cell stack-supporting members 5 fixed to the manifold 7 are arranged at the same or lower level than the upper ends of the fixed portions of the fuel cells 3 at the lower ends fixed to the manifold 7" refers to a state in which the fuel cell stack-supporting members 5 and the fuel cells 3 are arranged upright on a flat flush surface of the manifold 7. More specifically, in the case where the fuel cell stack-supporting members 5 and the fuel cells 3 are fixed to the manifold 7 via the joint member, this phrase refers to a state in which the interface between the fuel cell stack-supporting members 5 and the joint member is disposed at the same or lower level than the interface between the fuel cells 3 and the joint member.

In the case where the fuel cells 3 are deformed (warped), when the rigidity of the fuel cell stack-supporting members 5 that are arranged so as to hold the fuel cells 3 from both end sides in the arrangement direction is high, the fuel cell stack-supporting members 5 cannot be deformed flexibly following the deformation of the fuel cells 3, and intensive stress may be generated particularly in the fuel cells 3 on the lower end side (on the side of the manifold 7). In this case, the fuel cells 3 on the lower end side (on the side of the manifold 7) may be damaged (e.g., cracked).

Accordingly, the fuel cell stack-supporting members 5 can be preferably deformed flexibly following the deformation of the fuel cells 3, and the fuel cell stack-supporting members 5 can be preferably elastically deformed.

Here, the lower ends of the elastically deformable fuel cell stack-supporting members 5 are fixed to the manifold 7 for supplying a reactant gas (fuel gas) to the fuel cells 3, and, thus, portions (regions) of the fuel cell stack-supporting members 5 not fixed to the manifold 7 can be deformed flexibly following the deformation of the fuel cells 3. Accordingly, stress generated in the fuel cells 3, in particular, stress generated at the upper end portions thereof can be relaxed.

Furthermore, the upper ends of the fixed portions of the fuel cell stack-supporting members 5 fixed to the manifold 7 are arranged at the same or lower level than the upper ends of the fixed portions of the fuel cells 3 at the lower ends fixed to the manifold 7, and, thus, stress generated in the fuel cells 3, in particular, stress generated at the lower end portions thereof can be relaxed.

Accordingly, stress generated in the fuel cells 3 can be relaxed, and, thus, a damage to the fuel cells 3 can be suppressed, a fuel cell stack device 1A having an improved reliability can be obtained.

Here, in the case where the fuel cell stack-supporting members 5 are elastically deformable members, the fuel cell stack-supporting members 5 may be made of an elastically deformable material, and the thickness thereof may be reduced. Accordingly, the fuel cell stack-supporting members 5 can be elastically deformed (or can be more elastically deformed), and, thus, can be deformed flexibly following the deformation of the fuel cells 3. Thus, the thickness of the fuel cell stack-supporting members 5 may be, for example, approximately 2 mm, preferably, approximately 1 mm.

Furthermore, the height (the length in the upright direction) of the fuel cell stack-supporting members 5 is preferably set such that the height of the fuel cell stack-supporting members 5 that are fixed to the manifold 7 is the same as or larger than that of the upper end portions of the fuel cells 3, in order to effectively relax stress generated in the fuel cells 3 and to efficiently collect a current generated by the fuel cells 3.

Here, in a fuel cell device (a fuel cell module) in which the fuel cell stack device 1A is accommodated in a container, a heat insulator 32 is disposed around the fuel cell stack 2 (around the fuel cell stack device 1A) in order to suppress (prevent) transmission, to the outside, of radiant heat generated by the fuel cells 3 producing electric power.

Here, in the case where the end portions in the arrangement direction of the fuel cells 3 are realized as the elastically deformable fuel cell stack-supporting members 5, when a heat insulator 32 is disposed close to the fuel cell stack 2 (the fuel cell stack device 1A) along the arrangement direction of the fuel cells 3, the fuel cell stack-supporting members 5 deformed following the deformation (warping) of the fuel cells 3 may be brought into contact with the heat insulator 32, stress generated in the fuel cells 3 may not be relaxed, and a damage to the fuel cells 3 cannot be suppressed.

Conversely, in the case where the heat insulator 32 is disposed with a predetermined spacing interposed from the fuel cell stack-supporting members 5 assuming the length by which the elastically deformable fuel cell stack-supporting members 5 are deformed, positional adjustment of the heat insulator 32 is difficult.

Furthermore, there is a problem in that an assembly process of a fuel cell device that accommodates the fuel cell stack device 1A becomes complex.

Accordingly, the fuel cell stack device 1A of the invention includes the heat-insulator-supporting members 25 for supporting a heat insulator 32 with a predetermined spacing interposed from the fuel cell stack-supporting members 5. Here, "predetermined spacing" is preferably a spacing (distance) with which the elastically deformable fuel cell stack-supporting members 5 are not brought into contact with the heat-insulator-supporting members 25 even when the elastically deformable fuel cell stack-supporting members 5 are deformed, and can be set as appropriate, for example, the predetermined spacing can be set by checking in advance the size of the fuel cell stack device 1A and the degree of the fuel cell stack- supporting members 5 deformed.

Furthermore, positional adjustment of the heat insulator 32 can be performed simply by disposing the heat insulator such that the heat insulator is in contact with the heat-insulator-supporting members 25, and, thus, complexity in the assembly process of the fuel cell device can be solved. Here, in the invention, the heat insulator does not necessarily has to be in contact with the heat-insulator-supporting members 25, and the heat-insulator-supporting members 25 of the invention are possible even when the heat insulator is supported with a spacing interposed from the heat-insulator-supporting members 25.

According to the above-described configuration, the elastically deformable fuel cell stack-supporting members 5 are arranged, and, thus, a damage to the fuel cells 3 can be suppressed. Furthermore, since the heat-insulator-supporting members 25 are arranged, positional adjustment of the heat insulator 32 can be easily performed, and complexity in the assembly process of the fuel cell device can be solved.

Figure 7:
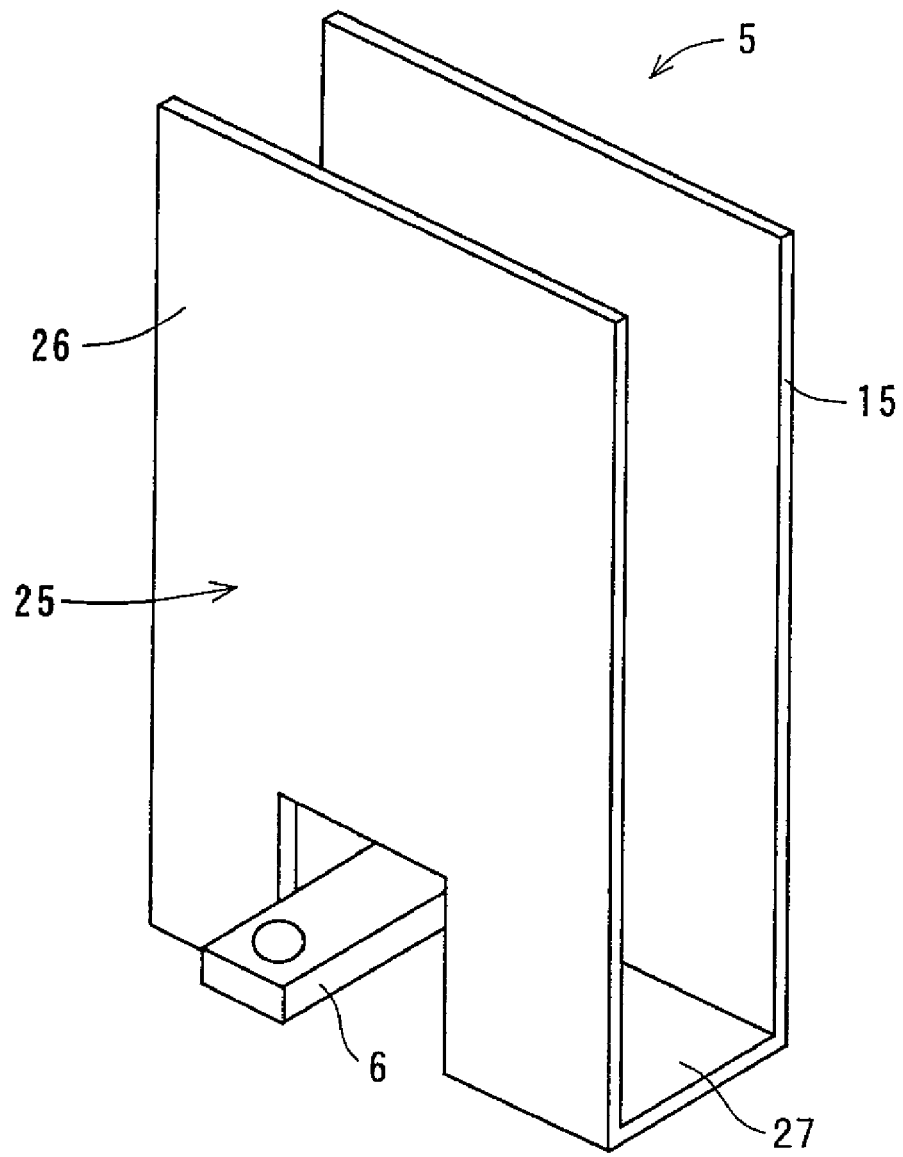
FIG. 7 is a perspective view showing an example of a fuel cell stack-supporting member and a heat-insulator-supporting member forming the fuel cell stack device according to the third embodiment of the invention.

FIG. 7 shows an example extracting the fuel cell stack-supporting member 5 and the heat-insulator-supporting member 25 forming the fuel cell stack device 1A of the invention.

Here, the example is shown in which the fuel cell stack-supporting member 5 and the heat-insulator-supporting member 25 shown in FIG. 7 respectively have the flat plate portion 15 and a flat plate portion 26. Accordingly, the contact area between the fuel cell stack-supporting members 5 and the fuel cells 3 in the shape of hollow flat plates can be increased, and a current generated by the fuel cells 3 producing electric power can be efficiently collected.

Furthermore, the heat-insulator-supporting members 25 have the flat plate portions 26, and, thus, for example, in the case where a plate-like heat insulator (a board-like heat insulator, etc.) is disposed on end sides of the fuel cell stack device 1A in the arrangement direction of the fuel cells 3, the area of the heat insulator in contact with the heat-insulator-supporting members 25 can be increased, and positional adjustment of the heat insulator can be easily performed.

Here, the lower end portions of the fuel cell stack-supporting member 5 and the heat-insulator-supporting member 25 shown in FIG. 7 may be connected to each other via a lower end portion-connecting plate 27, and the fuel cell stack-supporting member 5 and the heat-insulator-supporting member 25 shown in FIG. 7 can be formed by cutting and bending one plate-like member as appropriate.

Furthermore, in FIG. 7, a current-drawing portion 6 is disposed that extends outward from the flat plate portion 15 of the fuel cell stack-supporting member 5 along the arrangement direction of the fuel cells 3. Accordingly, a current generated by the fuel cells 3 producing electric power can be easily drawn.

Here, in the case where the current-drawing portions 6 are connected to the flat plate portions 15 of the fuel cell stack-supporting members 5, the fuel cell stack-supporting members 5 are preferably made of a conductive member (e.g., a metal member such as stainless steel). Here, in this case, the heat-insulator-supporting members 25 (the flat plate portions 26) and the lower end portion-connecting plates 27 may be made of an insulating material as well as a conductive material.

Furthermore, in the case where the current-drawing portions 6 are arranged, the current-drawing portions 6 are preferably arranged on the lower end side of the flat plate portions 15. Furthermore, in the case where the fuel cell stack-supporting members 5 connected to the current-drawing portions 6 are fixed to the manifold 7, the fuel cell stack-supporting members 5 are preferably fixed to the manifold 7 at a position lower than the current-drawing portions 6 such that the current-drawing portions 6 on the flat plate portions 15 are not brought into contact with the manifold 7. Here, the height of the current-drawing portions 6 can be set as appropriate according to the shape of the manifold 7, the size of the flat plate portions 15, and the like. Accordingly, regions of the flat plate portions 15 fixed to the manifold 7 also can be set as appropriate.

Furthermore, the lower ends of the fuel cell stack-supporting members 5 and the heat-insulator-supporting members 25 are fixed to the manifold 7 via an insulating joint members such as a glass sealing member, and, in a similar manner, the lower end portion-connecting plates 27 are fixed to the manifold 7 via a glass sealing member. Accordingly, the lower end portion-connecting plates 27 may be provided with holes as appropriate in order to firmly fix the lower end portion-connecting plates 27 to the manifold 7.

Figure 8:
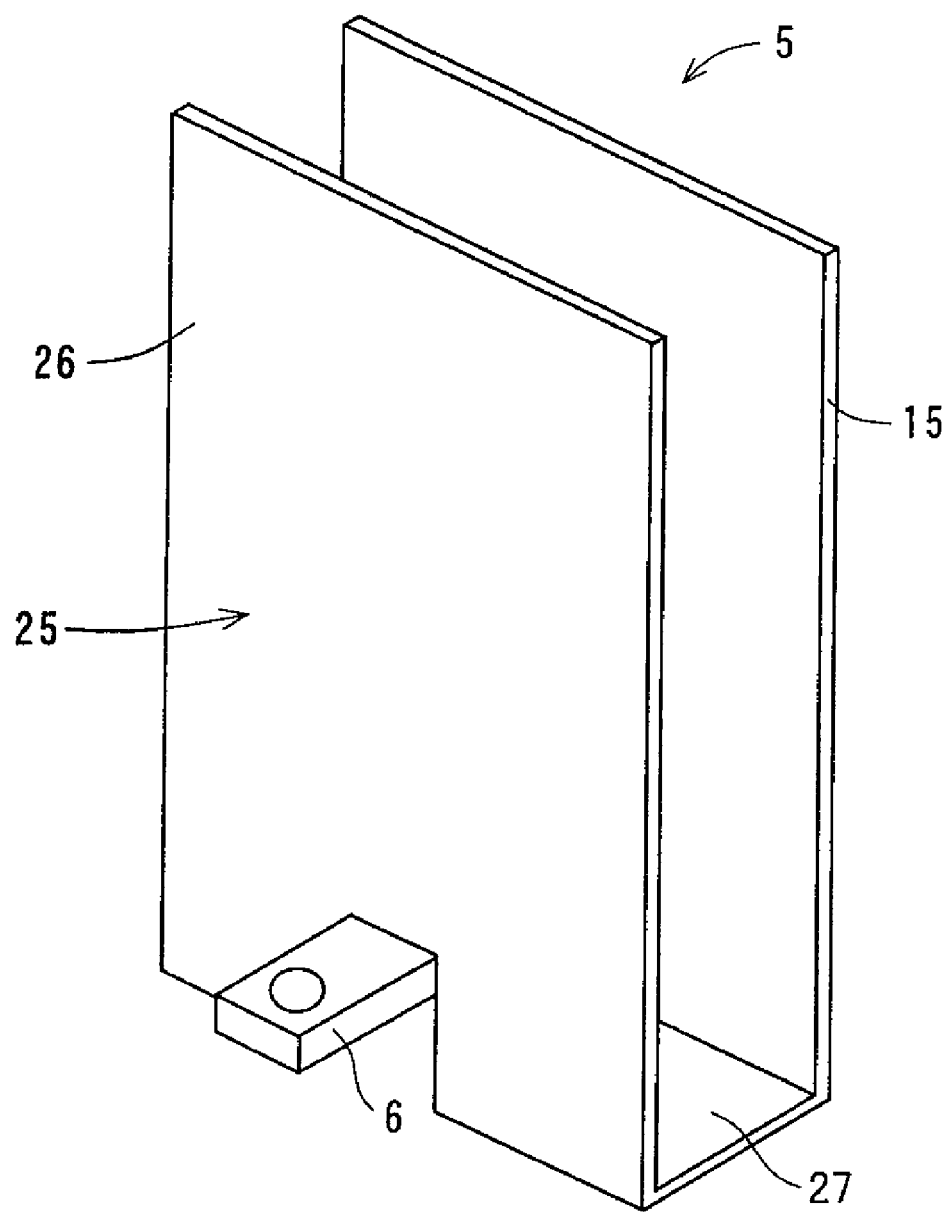
FIG. 8 is a perspective view showing another example of a fuel cell stack-supporting member and a heat-insulator-supporting member forming the fuel cell stack device according to the third embodiment of the invention.

FIG. 8 shows an example in which the current-drawing portion 6 shown in FIG. 7 is connected to the flat plate portion 26 of the heat-insulator-supporting member 25. Also in this case, in a similar manner, a current generated by the fuel cells 3 producing electric power can be easily drawn.

However, in this case, in the case where a current generated by the fuel cells 3 producing electric power is drawn from the current-drawing portions 6, each of the fuel cell stack-supporting members 5 (the flat plate portions 15), the heat-insulator-supporting members 25 (the flat plate portions 26), and the lower end portion-connecting plates 27 are preferably made of a conductive member such as stainless steel.

Figure 9:
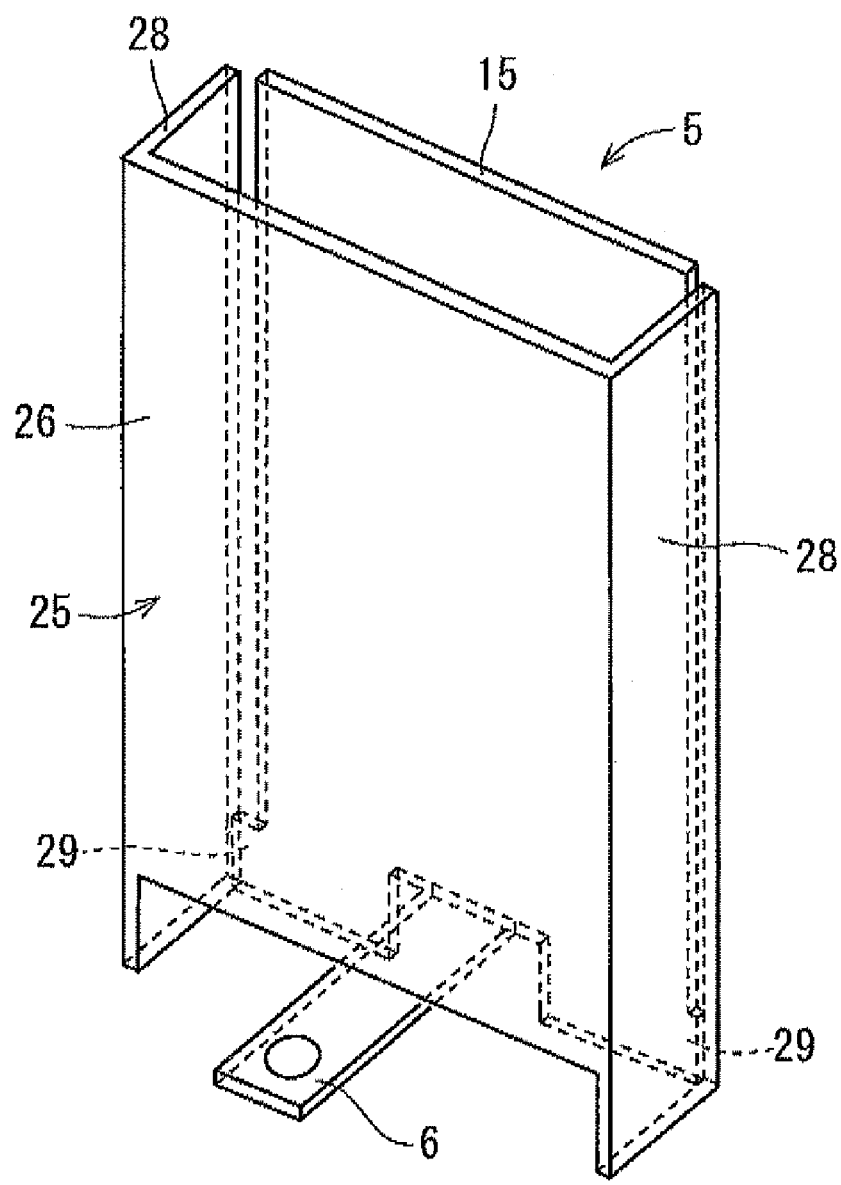
FIG. 9 is a perspective view showing still another example of a fuel cell stack-supporting member and a heat-insulator-supporting member forming the fuel cell stack device according to the third embodiment of the invention.

FIG. 9 shows another example of the fuel cell stack-supporting member 5 and the heat-insulator-supporting member 25. Here, a pair of side plate portions 28 are provided that extend so as to be bent from both edges of the flat plate portion 26 of the heat-insulator-supporting member 25 toward the fuel cell stack 2, and the side plate portions 28 are arranged so as to be positioned further outward than the flat plate portion 15 of the fuel cell stack-supporting member 5 when viewed from above.

Here, the heat-insulator-supporting members 25 have the pair of side plate portions 28 that extend so as to be bent from both edges of the flat plate portion 26 toward the fuel cell stack 2, and, thus, the rigidity of the heat-insulator-supporting members 25 (the flat plate portions 26) can be increased.

Accordingly, in the case where a heat insulator is disposed on end sides of the fuel cell stack device 1A in the arrangement direction of the fuel cells 3, the heat insulator can be more firmly fixed to the heat-insulator-supporting members 25, and positional adjustment of the heat insulator can be more easily performed.

Furthermore, since the rigidity of the heat-insulator-supporting members 25 (the flat plate portions 26) is increased, even when the heat insulator is disposed close to (in contact with) the heat-insulator-supporting members 25, the heat-insulator-supporting members 25 (the flat plate portions 26) can be suppressed (prevented) from being inclined toward the fuel cell stack-supporting member 5 and brought into contact therewith. Accordingly, relaxation of stress generated in the fuel cells 3 is not hampered, and a damage to the fuel cells 3 can be suppressed.

Furthermore, the side plate portions 28 are arranged so as to be positioned further outward than the flat plate portion 15 of the fuel cell stack-supporting members 5 when viewed from above, and, thus, the side plate portions 28 can be suppressed from hampering the deformation of the fuel cell stack-supporting members 5 (the flat plate portions 15) according to the warping of the fuel cells 3.

Accordingly, in the case where the pair of side plate portions are arranged in the heat-insulator-supporting members 25 (the flat plate portions 26), the rigidity of the heat-insulator-supporting members 25 can be increased, positional adjustment of the heat insulator can be more easily performed, and a damage to the fuel cells 3 can be suppressed.

Furthermore, in the case where an oxygen-containing gas supplied to the fuel cells 3 flows through a space between the flat plate portion 15 of the fuel cell stack-supporting member 5 and the flat plate portion 26 of the heat-insulator-supporting member 25, air having a low temperature flows toward the end portions of the fuel cell stack 2, and, thus, the temperature on end sides of the fuel cell stack 2 decreases. Accordingly, the temperature distribution of the fuel cell stack 2 is not uniform (is curved with a high portion in the middle), and, thus, the efficiency in which the fuel cell stack 2 produces electric power may deteriorate.

Accordingly, in the case where a gap between the side plate portions 28 and the flat plate portion 15 of the fuel cell stack-supporting member 5 is reduced, an oxygen-containing gas supplied to the fuel cells 3 can be suppressed from flowing through a space between the flat plate portion 15 of the fuel cell stack-supporting member 5 and the flat plate portion 26 of the heat-insulator-supporting member 25, and the efficiency in which the fuel cell stack 2 produces electric power can be suppressed from deteriorating.

Here, the size of the side plate portions 28 can be set as appropriate, but is preferably set such that the side plate portions 28 are arranged at the same level as the flat plate portions 15 of the fuel cell stack-supporting members 5 not fixed to the manifold 7, in consideration of the temperature distribution of the fuel cell stack described above. Furthermore, the side plate portions 28 may project further toward the fuel cell stack 2 than the flat plate portions 15 of the fuel cell stack-supporting members 5 when viewed from above, as long as the side plate portions 28 are not brought into contact with the fuel cells 3.

In FIG. 9, both edges of the flat plate portion 15 of the fuel cell stack-supporting member 5 has a pair of side plate portions 29 that are arranged at a position lower than the current-drawing portion 6 and that are connected to the side plate portions 28 of the heat-insulator-supporting member 25. In FIG. 9, the side plate portions 29 are indicated by the solid lines.

Here, examples of the shape of the manifold 7 include a shape that has opening portions on a surface (on the side of the fuel cells 3), a shape in which the manifold 7 has a top plate portion having insertion holes or the like corresponding to the fuel cells 3, the fuel cell stack-supporting members 5, and the heat-insulator-supporting members 25, and the like.

Here, in the case where the manifold 7 has a shape that has opening portions on the surface thereof, since both edges of the flat plate portions 15 of the fuel cell stack-supporting members 5 have the side plate portions 29 at a position lower than the current-drawing portions 6, the joint area between the fuel cell stack-supporting members 5 and the manifold 7 (joint member) can be increased, and the fuel cell stack-supporting members 5 can be stably fixed to the manifold 7.

Furthermore, portions of the fuel cell stack-supporting members 5 (the flat plate portions 15), the heat-insulator-supporting members 25 (the flat plate portions 26), and the side plate portions 28 of the heat-insulator-supporting members 25 lower than the current-drawing portions 6, and the side plate portions 29 of the fuel cell stack-supporting members 5 are preferably fixed to the manifold 7 via a joint member such as a glass sealing member. Accordingly, the fuel cell stack-supporting members 5 and the heat-insulator-supporting members 25 can be firmly fixed to the manifold 7.

In addition, since the fuel cell stack-supporting members 5 are fixed to the manifold 7 at a position lower than the current-drawing portions 6, portions (regions) of the flat plate portions 15 of the fuel cell stack-supporting members 5 not fixed to the manifold 7 can be increased, and the flat plate portions 15 can be elastically deformed, and, thus, can be deformed flexibly following the deformation of the fuel cells 3.

Furthermore, the current-drawing portions 6 are preferably not fixed via a joint member such as a glass sealing member. The reason for this is that, in a state where current wires are connected to the current-drawing portions 6, the current-drawing portions 6 may be moved, for example, by vibrations generated when the fuel cell device that accommodates the fuel cell stack device 1 of the invention is transported or when an earthquake occurs, and, thus, stress is applied to the fuel cell stack-supporting members 5 and the heat-insulator-supporting members 25, and, for example, the fuel cells 3 may be damaged or the joint member such as a glass sealing member may be cracked.

Figure 10:
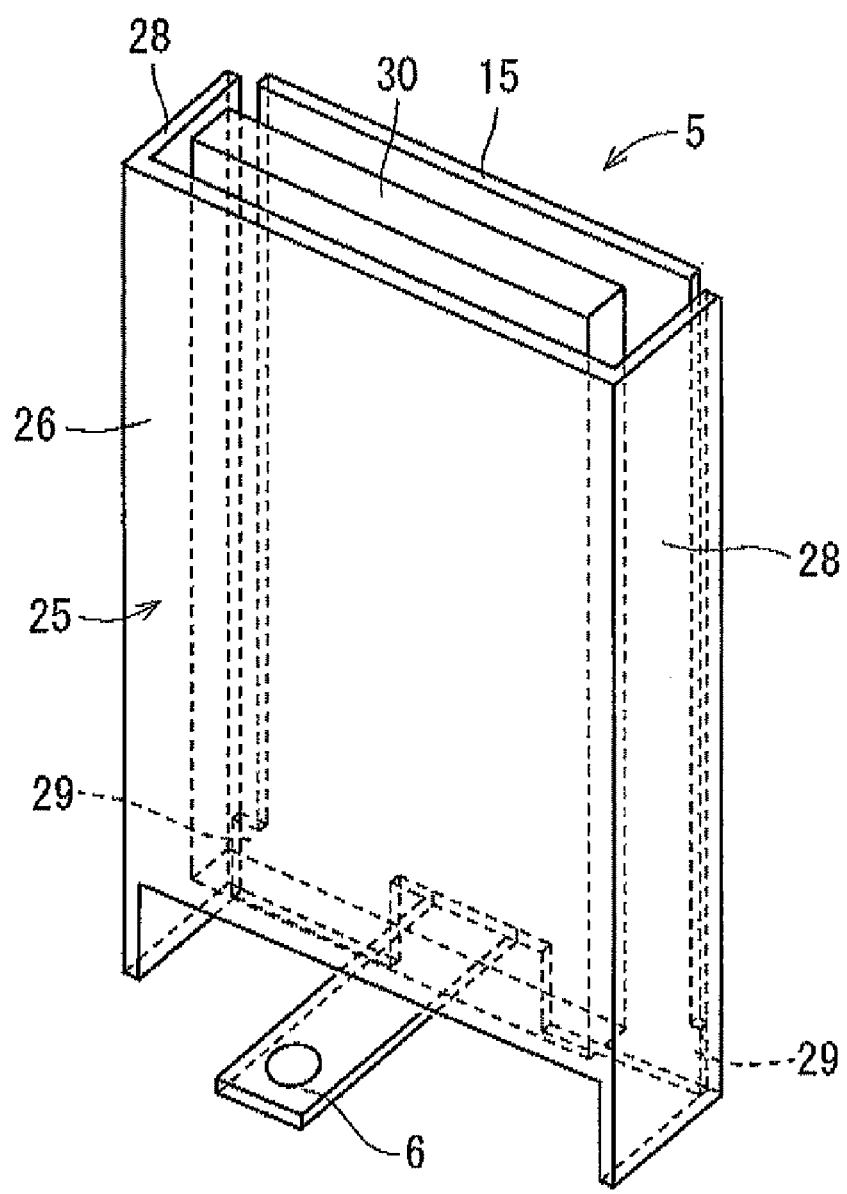
FIG. 10 is a perspective view showing still another example of a fuel cell stack-supporting member and a heat-insulator-supporting member forming the fuel cell stack device according to the third embodiment of the invention.

FIG. 10 shows an example in the case where a resonance-suppressing member 30 is disposed between the fuel cell stack-supporting member 5 and the heat-insulator-supporting member 25.

When the fuel cell device that accommodates the fuel cell stack device 1A as described above is transported or when an earthquake occurs, vibrations may be generated in the fuel cell stack device 1A. At that time, since the fuel cell stack-supporting members 5 in the fuel cell stack device 1A of the invention can be elastically deformed, the fuel cell stack-supporting members 5 may resonate with vibrations of the fuel cell stack device 1A, and, thus, the fuel cells 3 may be damaged, and the durability of the fuel cell stack-supporting members 5 may be lowered.

Here, since the resonance-suppressing members 30 are arranged between the fuel cell stack-supporting members 5 and the heat-insulator-supporting members 25, the fuel cell stack-supporting members 5 can be suppressed from resonating with vibrations of the fuel cell stack device 1A, and, thus, the fuel cells 3 can be suppressed from being damaged, and the durability of the fuel cell stack-supporting members 5 can be suppressed from being lowered.

Here, the resonance-suppressing members 30 are preferably a member that is flexible and hardly affects elastic deformation of the fuel cell stack-supporting members 5, and may be made of, for example, a flocculent heat insulator, glass wool, or the like. Furthermore, the size of the resonance-suppressing members 30 can be set as appropriate according to the size of the fuel cell stack device 1A, the distance between the fuel cell stack-supporting members 5 and the heat-insulator-supporting members 25, and the like. FIG. 10 shows an example in which the resonance-suppressing member 30 is disposed between the fuel cell stack-supporting member 5 and the heat-insulator-supporting member 25 with gaps interposed therebetween. Here, the resonance-suppressing member 30 may be disposed such that the gaps from the fuel cell stack-supporting member 5 and the heat-insulator-supporting member 25 are not formed.

(Fourth Embodiment)

Figure 11A:
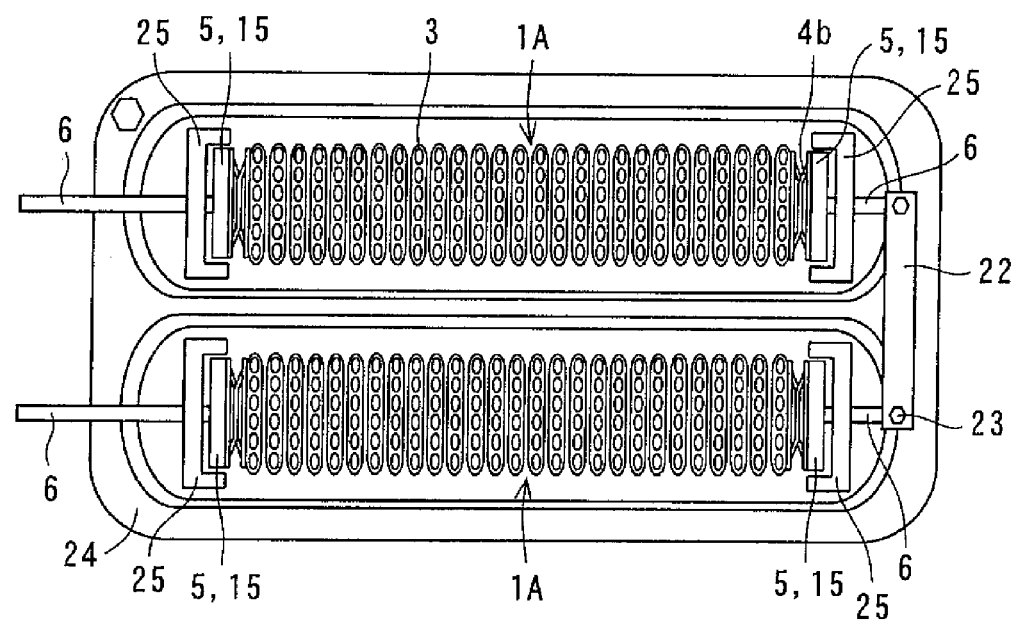
FIG. 11A is a plan view schematically showing a fuel cell stack connection device according to a fourth embodiment of the invention.
Figure 11B:
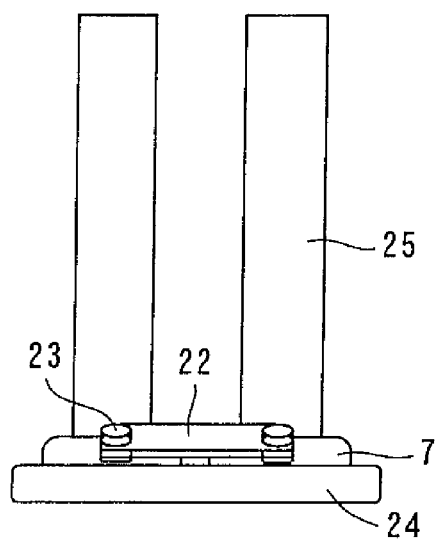
FIG. 11B is a front view of the fuel cell stack connection device of FIG. 11A.
Figure 12A:
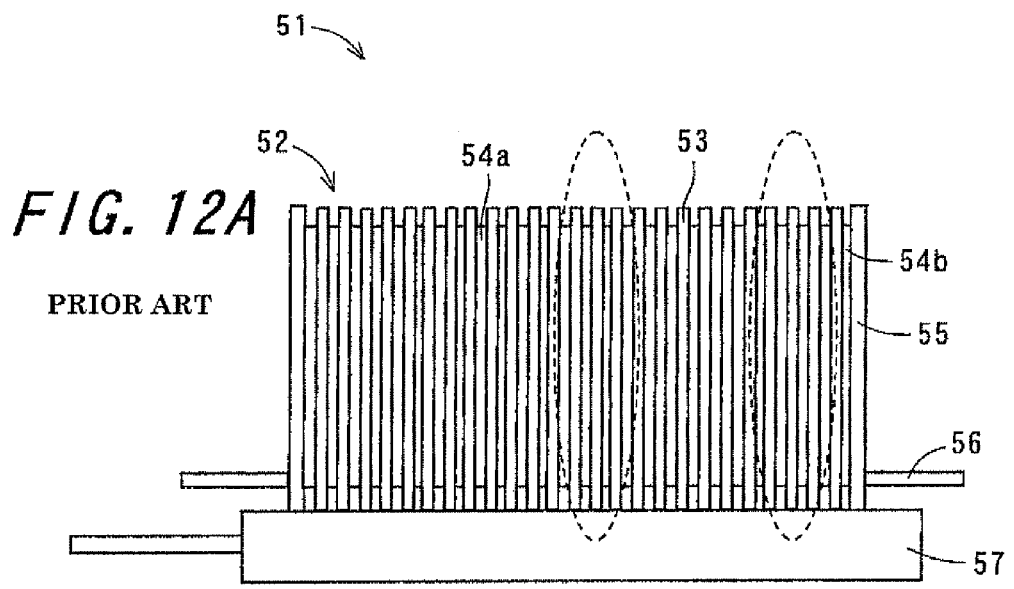
FIG. 12A is a side view schematically showing a conventional fuel cell stack device.
Figure 12B:
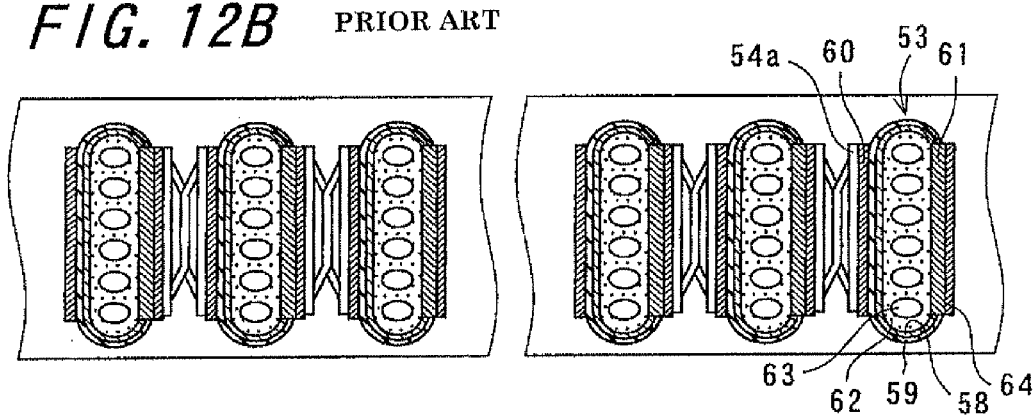
FIG. 12B is a plan view partially enlarging portions enclosed by dotted frames in the fuel cell stack device in FIG. 12A.

FIGS. 11A and 11B show a fuel cell stack connection device 31 according to a fourth embodiment of the invention, where FIG. 11A is a plan view, and FIG. 11B is a front view. Here, in FIG. 11A, the current-collecting members 4a for electrically connecting the fuel cells 3 are not shown. In the fuel cell stack connection device 31, two fuel cell stack devices 1A of the invention are arranged side by side such that the arrangement directions of the fuel cells 3 are parallel to each other and such that the polarities of currents at ends of the fuel cell stack devices 1A on the same side are opposite each other, and the current-drawing portions 6 arranged at ends of the fuel cell stack devices 1A on the same side are connected by a conductive connecting member 22.

As shown in FIGS. 11A and 11B, the current-drawing portions 6 arranged at ends of two fuel cell stack devices 1A on the same side, which are arranged side by side such that the polarities of currents are opposite each other, are connected by screwing the conductive connecting member 22 with the screws 23, and, thus, the two fuel cell stack devices 1A can be electrically connected in series.

Accordingly, the two fuel cell stack devices 1A can be easily electrically connected in series, and the two fuel cell stack devices 1A can be arranged in a small space.

In this case, the manifolds 7 are connected to the hollow member (pedestal) 24, and, thus, a reactant gas can be supplied from one reactant gas supply tube to the manifolds 7 of the two fuel cell stack devices 1A forming the fuel cell stack connection device 31. Accordingly, the size of the fuel cell stack connection device 31 can be reduced.

Furthermore, in the case where the fuel cell stack device 1A or the fuel cell stack connection device 31 described above is surrounded by a heat insulator and accommodated in a container, even when the fuel cells 3 are deformed, the fuel cell stack-supporting members 5 (the flat plate portions 15) can be deformed flexibly following the deformation of the fuel cell 3, and, thus, stress generated in the fuel cells 3 can be relaxed, and a damage to the fuel cells 3 can be suppressed. Accordingly, a fuel cell device having an improved reliability for a long period of time can be obtained.

Furthermore, since the heat-insulator-supporting members 25 are arranged, positional adjustment of the heat insulator can be easily performed, and complexity in the assembly process of the fuel cell device can be solved.

In the description above, the example is shown in which a fuel gas is supplied to the interior of the fuel cells 3, and an oxygen-containing gas is caused to flow along the exterior of the fuel cells 3, but, for example, fuel cells 3 may be also used in which an oxygen-containing gas is supplied to the interior of the fuel cells 3, and a fuel gas is caused to flow along the exterior of the fuel cells 3.

Furthermore, the shape of the current-collecting member 4a and the end current-collecting members 4b also may be shapes other than the above, as long as the shape can establish electrical connection between the fuel cells 3 and can cause an oxygen-containing gas to flow between the fuel cells 3. For example, it is possible to use a current-collecting member including a pair of connecting portions that are arranged along the longitudinal direction of the fuel cells 3, and a plurality of plate-like contact portions that are to be brought into contact with adjacent fuel cells 3 arranged so as to connect the pair of connecting portions.

EXAMPLES

First, an NiO powder having an average particle size of 0.5 µm and a $Y_2O_3$ powder having an average particle size of 0.9 µm were mixed such that the volume ratio after firing and reduction was NiO 48 vol %:$Y_2O_3$ 52 vol %. This mixture, an organic binder, and a solvent were mixed to form a mixture, and the mixture was molded by extrusion molding, dried, and degreased to form a mold for the support substrate 12.

Next, an NiO powder having an average particle size of 0.5 a powder of $ZrO_2$ solid solution containing $Y_2O_3$, an organic binder, and a solvent were mixed to form a slurry for the fuel-side electrode layer 8, and the slurry was applied to the mold for the support substrate 12 by screen printing and dried to form a coating layer for the fuel-side electrode layer 8.

Next, a powder of $ZrO_2$ solid solution containing 8 mol % of $Y_2O_3$ having a particle size measured according to a Microtrac method of 0.8 µm (a material powder for the solid electrolyte layer 9), an organic binder, and a solvent were mixed to form a slurry, and the slurry was used to form a sheet for the solid electrolyte layer 9 having a thickness of 40 µm by a doctor blade method. The sheet for the solid electrolyte layer 9 was attached to the coating layer for the fuel-side electrode layer 8 and dried.

Subsequently, a layered molded member in which layers are formed on a molded member as described above was calcined at 1000° C. for three hours.

Subsequently, an $LaCrO_3$-based oxide, an organic binder, and a solvent were mixed to form a slurry for the interconnector 11, and the slurry was layered on an exposed portion of a calcined body for the support substrate 12 on which the calcined body for the solid electrolyte layer 9 is not formed, and they were co-sintered (co-fired) in the air at 1510° C. for three hours.

Next, an $La_{0.6}Sr_{0.4}Co_{0.2}Fe_{0.8}O_3$ powder having an average particle size of 2 µm and isopropyl alcohol were mixed to form a mixed liquor, and the mixed liquor was sprayed on the surface of the solid electrolyte layer 9 in the layered sintered body to form a preform for the air-side electrode layer 10. The resulting material was fired at 1100° C. for four hours to form the air-side electrode layer 10, and, thus, the fuel cell 3 was formed.

Seven fuel cells 3 formed in this manner were arranged upright with the current-collecting members 4a interposed therebetween, and were held by the fuel cell stack-supporting members 5 shown in the first embodiment via the end current-collecting members from both end sides in the arrangement direction of the fuel cells 3, and, thus, the fuel cell stack device 1 was formed. Here, current-collecting members used as the current-collecting member 4a and the end current-collecting members 4b had the shape shown in FIG. 4.

Furthermore, as the fuel cell stack-supporting members 5, fuel cell stack-supporting members were used in which a pair of side plate portions that extended so as to be bent from both edges of the flat plate portion 15 shown in FIG. 3 were arranged at a position lower than the current-drawing portion 6.

Next, in this fuel cell stack device 1, a hydrogen-containing gas was caused to flow through the fuel cells 3 (the gas flow paths 13), and the support substrates 12 and the fuel-side electrode layers 8 were reduced at 850° C. for 10 hours.

In the thus obtained fuel cell stack device 1, strain gauges were respectively attached to the upper end, the center, and the lower end in the upright direction, on the sides of the air-side electrode layer 10 and the interconnector 11, in the fuel cells 3 positioned at both ends (1st and 7th) and the center (4th) in the arrangement direction of the fuel cells 3, and the current-collecting member 4a adjacent to the fuel cells 3, to which the strain gauges were attached, was removed, and strain of the fuel cells 3 when the current-collecting member 4a was removed was recorded using a data logger.

Figure 13:
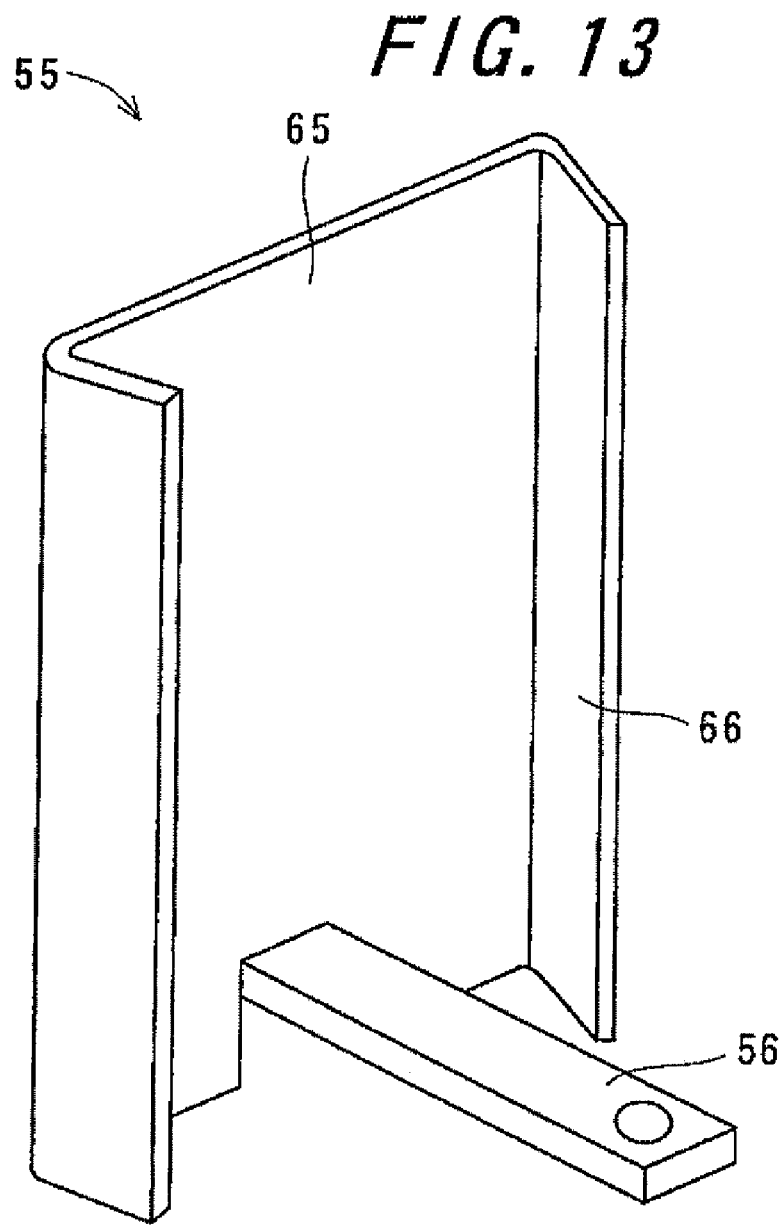
FIG. 13 is a perspective view showing an example of a conductive member forming the conventional fuel cell stack device.

Furthermore, as a comparative example, a fuel cell stack device was used having conductive members 55 (members that could not be elastically deformed) shown in FIG. 13 in which a pair of side plate portions that extended so as to be bent from both edges of the flat plate portion 65 were arranged along the entire length in the height direction of the flat plate portion 65.

TABLE 1

| | | Air-side electrode layer side (µε) | | | Interconnector side (µε) | | |
|---|---|---|---|---|---|---|---|
| | | Upper end portion | Center | Lower end portion | Upper end portion | Center | Lower end portion |
| Ex. | 1st Cell | 15.7 | −37.2 | −46.2 | 1.9 | 14.1 | 40.0 |
| | 4th Cell | −18.9 | −21.2 | −23.2 | 37.0 | −22.6 | 34.8 |
| | 7th Cell | −38.1 | −61.6 | −22.0 | −10.8 | −3.2 | −47.3 |
| Comp. Ex. | 1st Cell | −49.8 | −63.6 | −129.2 | −15.5 | −31.7 | 78.4 |
| | 4th Cell | −58.4 | −88.2 | −67.1 | −35.4 | 57.6 | 42.4 |
| | 7th Cell | −114.4 | −38.5 | −77.7 | −39.9 | −35.9 | 30.7 |

In the values shown in Table 1, a negative value indicates strain of the fuel cell 3 in its contraction direction, and a positive value indicates strain of the fuel cell 3 in its expansion direction. That is to say, a small absolute value indicates small strain, and a large absolute value indicates large strain. Accordingly, these values can be used as indicators of stress generated in the fuel cell 3.

Here, according to the results in Table 1, all values on the side of the air-side electrode layer 10 of the fuel cell 3, excluding the value of the upper end portion of the 1st cell, are negative values, and, thus, it is seen that the fuel cell 3 produced through the above-described process tends to be bent to the side of the air-side electrode layer 10.

Furthermore, in the case where the strains of the fuel cells 3 were compared with each other, regarding the 1st fuel cell, values of the fuel cell stack device 1 of the invention were smaller than those of the comparative example in all strain gauges arranged on the side of the air-side electrode layer 10 and on the side of the interconnector 11. Accordingly, it is seen that stress applied to the fuel cell 3 was reduced.

Furthermore, in a similar manner, regarding the 4th and the 7th fuel cells 3, values of the fuel cell stack device 1 of the invention were smaller than those of the comparative example in most strain gauges, although values of the fuel cell stack device 1 of the invention were large in part of the strain gauges depending on the arrangement position of the strain gauges.

Accordingly, it is seen that, in the fuel cell stack device 1 of the invention, stress applied to the fuel cells 3 can be reduced, and, thus, a damage to the fuel cells 3 can be suppressed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

The Invention claimed is:

1. A fuel cell stack device comprising:
   a fuel cell stack in which a plurality of columnar fuel cells are arranged upright, and are electrically connected via a current collecting member interposed between adjacent fuel cells;
   a manifold that fixes lower ends of the fuel cells, and that supplies a reactant gas to the fuel cells; and
   an elastically deformable fuel cell stack-supporting member that has a lower end fixed to the manifold, and that is disposed so as to hold the fuel cell stack via an end current-collecting member from both end sides in an arrangement direction of the fuel cells of the fuel cell stack,
   the fuel cell stack-supporting member having a flat plate portion that is made of a conductive member, a current-drawing portion that extends outward along the arrangement direction of the cells from an lower end side of the flat plate portion, and a pair of side plate portions that respectively extend so as to be bent from different edge sides of the flat plate portion, the entirety of the pair of side plate portions being arranged at a position lower than the current-drawing portion, and
   the fuel cell stack-supporting member being disposed such that a fixed portion thereof fixed to the manifold is at a same or lower level than a fixed portion of the fuel cells.

2. The fuel cell stack device of claim 1, wherein, in the fuel cell stack-supporting member, a portion of the flat plate portion lower than the current-drawing portion and the side plate portions are fixed to the manifold.

3. A fuel cell stack connection device constituted so that two fuel cell stack devices of claim 1 are arranged side by side such that arrangement directions of the fuel cells are parallel to each other and such that polarities of currents at ends of the fuel cell stack devices on a same side are opposite each other, and the current-drawing portions arranged at ends of the fuel cell stack devices on a same side are connected by a conductive connecting member.

4. A fuel cell device constituted by accommodating the fuel cell stack device of claim 1 in a container.

5. The fuel cell device of claim 4, wherein the fuel cell stack device is accommodated in a container in a state where the fuel cell stack device is surrounded by a heat insulator.

6. A fuel cell device constituted by accommodating the fuel cell stack connection device of claim 3 in a container.

7. The fuel cell device of claim 6, wherein the fuel cell stack connection device is accommodated in a container in a state where the fuel cell stack connection device is surrounded by a heat insulator.

8. A fuel cell stack device comprising:
   a fuel cell stack in which a plurality of columnar fuel cells are arranged upright, and are electrically connected via a current collecting member interposed between adjacent fuel cells;
   a manifold that fixes lower ends of the fuel cells, and that supplies a reactant gas to the fuel cells;
   an elastically deformable fuel cell stack-supporting member that has a lower end fixed to the manifold, and that is disposed so as to hold the fuel cell stack via an end current-collecting member from both end sides in an arrangement direction of the fuel cells of the fuel cell stack; and
   a heat-insulator-supporting member that has a lower end fixed to the manifold, and that supports a heat insulator disposed with a predetermined spacing interposed from the fuel cell stack-supporting member,
   a fixed portion of the fuel cell stack-supporting member being disposed at a same or lower level than a fixed portion of the fuel cells.

9. The fuel cell stack device of claim 8, wherein each of the fuel cell stack-supporting member and the heat-insulator-supporting member has a flat plate portion, the flat plate portion of the heat-insulator-supporting member has a pair of side plate portions that extend so as to be bent from both edges of the flat plate portion toward the cell stack, and the side plate portions are arranged so as to be positioned further outward than the flat plate portion of the fuel cell stack-supporting member when viewed from above.

10. The fuel cell stack device of claim 9, wherein the fuel cell stack-supporting member is made of a conductive member, and the flat plate portion of the fuel cell stack-supporting member has a current-drawing portion that extends outward along the arrangement direction of the fuel cells.

11. The fuel cell stack device of claim 9, wherein the fuel cell stack-supporting member and the heat-insulator-supporting member are made of a conductive member and are connected to each other on a lower end side, and the flat plate portion of the heat-insulator-supporting member has a current-drawing portion that extends outward along the arrangement direction of the fuel cells.

12. The fuel cell stack device of claim 11, wherein both edges of the flat plate portion of the fuel cell stack-supporting member have a pair of side plate portions that are arranged at a position lower than the current-drawing portion and that are connected to the side plate portions of the heat-insulator-supporting member.

13. The fuel cell stack device of claim 12, wherein portions of the flat plate portion of the fuel cell stack-supporting member, the flat plate portion of the heat-insulator-supporting member, and the side plate portions of the heat-insulator-supporting member lower than the current-drawing portion, and the side plate portions of the fuel cell stack-supporting member are fixed to the manifold.

14. The fuel cell stack device of claim 8, further comprising a resonance-suppressing member that suppresses resonance of the fuel cell stack-supporting member according to vibrations of the fuel cell stack, between the fuel cell stack-supporting member and the heat-insulator-supporting member.

15. A fuel cell stack connection device constituted so that two fuel cell stack devices of claim 10 are arranged side by side such that arrangement directions of the fuel cells are parallel to each other and such that polarities of currents at ends of the fuel cell stack devices on a same side are opposite each other, and the current-drawing portions arranged at ends of the fuel cell stack devices on a same side are connected by a conductive connecting member.

16. A fuel cell device constituted by accommodating the fuel cell stack device of claim 8 in a container.

17. A fuel cell device constituted by accommodating the fuel cell stack device of claim 15 in a container.

* * * * *